H. E. COONS.
OVEN.
APPLICATION FILED JAN. 14, 1921.
1,403,012. Patented Jan. 10, 1922.
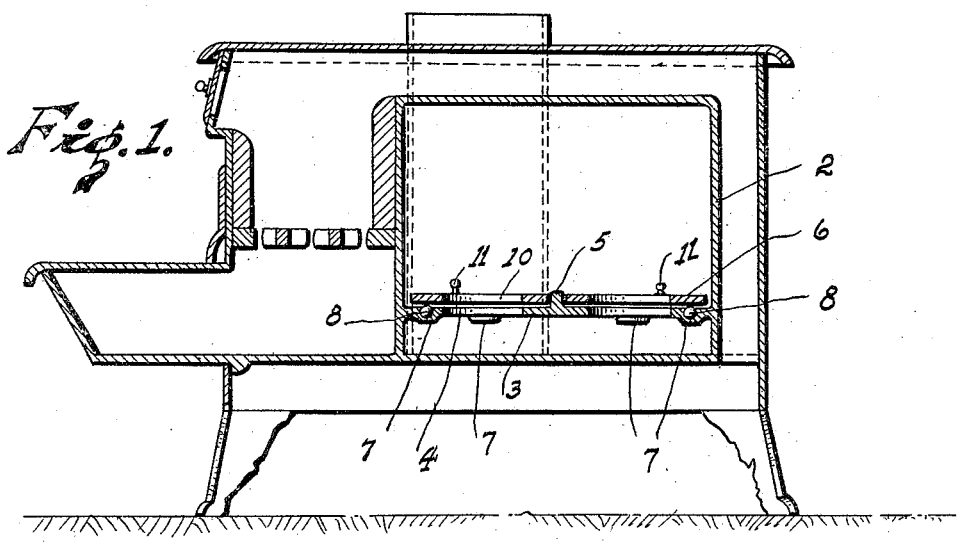
Fig. 1.
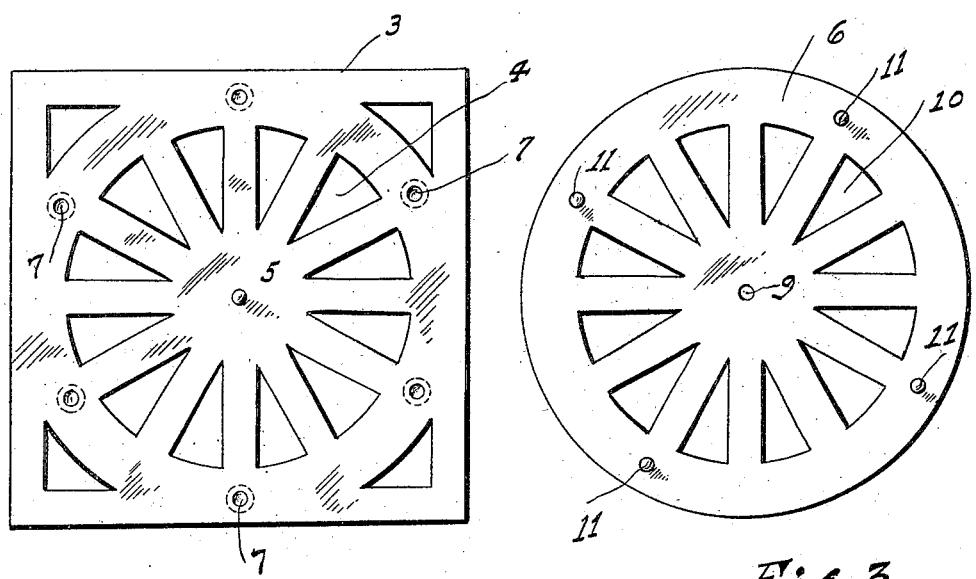
Fig. 2.
Fig. 3.
Inventor
Herbert E. Coons
By
Lacey & Lacey, Attorneys

UNITED STATES PATENT OFFICE.

HERBERT E. COONS, OF HARPURSVILLE, NEW YORK.

OVEN.

1,403,012.

Specification of Letters Patent.

Patented Jan. 10, 1922.

Application filed January 14, 1921. Serial No. 437,253.

*To all whom it may concern:*

Be it known that I, HERBERT E. COONS, a citizen of the United States, residing at Harpursville, in the county of Broome and State of New York, have invented certain new and useful Improvements in Ovens, of which the following is a specification.

This invention relates to ovens for baking and roasting articles of food and has for its object the provision of means whereby the temperature of articles in the oven may be regulated and whereby they may be easily brought to the front of the oven to be removed or inspected. The invention is illustrated in the accompanying drawings and will be hereinafter fully set forth.

In the drawings —

Figure 1 is a vertical longitudinal section of a conventional form of cooking stove having my improvements embodied therein;

Fig. 2 is a plan view of the shelf or upper bottom of the oven;

Fig. 3 is a plan view of the rotary plate.

Referring particularly to the drawings, the numeral 1 designates a conventional form of cooking stove having an oven 2 therein. In carrying out my invention, the shelf or upper bottom 3, spaced above the regular or solid bottom of the oven and preferably made integral with the side walls thereof, is provided with a plurality of openings 4 therethrough and these openings are preferably of triangular form, as shown clearly in Fig. 2, and disposed radially of the upper bottom 3, while the latter is square or conforming to the shape of the oven. At the center of the upper bottom 3 is a stud 5 which projects a slight distance above the upper surface thereof and constitutes a pivot about which the rotary plate 6 may turn. The upper bottom 3 is also provided at intervals with a series of sockets 7, the said sockets being preferably disposed in relative circular formation concentric with the pivot stud 5, as shown most clearly in Fig. 2. These sockets 7 receive balls 8 or other anti-friction devices upon which the rotary plate 6 may rest whereby frictional contact between the rotary plate 6 and upper bottom 3 is avoided and the rotary plate may be turned easily when desired. The rotary plate is circular and provided at its center with an opening 9 to receive the pivot stud 5, so that the plate will be disposed concentric with the upper bottom and through the plate 6 are formed a plurality of openings 10 corresponding in size, number and shape to the openings 4 through the upper bottom 3, so that the circulation of heated air upwardly through the oven may be nicely regulated. If the openings 10 be caused to coincide with the openings 4, the heat currents from below the oven will be permitted to pass through the openings to the full capacity of the same and if the rotary plate be turned so that the openings 10 will be out of alinement with the openings 4, the flow of the heat currents may be more or less completely cut-off in an obvious manner. To facilitate the turning of the plate 6, small handles or projections 11 are provided on the upper side thereof at intervals, as shown clearly in Figs. 1 and 3.

The articles to be cooked are placed upon the rotary plate 6 in the same manner as they are ordinarily placed upon the bottom of an oven and the plate adjusted so as to regulate the temperature of the oven according to the nature of the food being cooked. If it be desired to inspect articles at the rear of the plate 6, the latter is turned and, of course, the articles thereon will be successively brought to the front of the oven where they may be easily inspected and, if fully cooked, may be removed. It will thus be seen that I avoid the necessity now existing of the cook reaching into a hot oven to handle hot pans and thereby being exposed to injury. The device is exceedingly simple and is not apt to get out of order and may be readily applied to any oven at a low cost. The plate 6 will be retained in its proper position by the pivot stud and the anti-friction supporting devices 8. Moreover, the improvements may be applied to any oven without materially decreasing the capacity of the same.

Having thus described the invention, what is claimed as new is:

In combination with an oven having a solid bottom, roof and side walls; of a shelf integral with said walls and spaced from said bottom, said shelf having radial arms forming triangular openings between them, sockets being provided in alignment with said arms on the upper side of said shelf, balls deposited in said sockets to provide antifriction bearings, a central stud on the upper side of said shelf; a plate having a circular rim adapted to engage with said walls and provided with radial arms forming apertures between them corresponding to the openings in said shelf, a central hole being formed in said plate adapted to engage with said stud, and knobs on the upper side of said plate in alignment with said arms, whereby said plate may be turned upon said walls around said stud.

In testimony whereof I affix my signature.

HERBERT E. COONS. [L. S.]